US011710097B2

(12) United States Patent
Sanchez et al.

(10) Patent No.: US 11,710,097 B2
(45) Date of Patent: Jul. 25, 2023

(54) SYSTEMS AND METHODS FOR OBTAINING INCIDENT INFORMATION TO REDUCE FRAUD

(71) Applicant: BLUEOWL, LLC, San Francisco, CA (US)

(72) Inventors: Kenneth J. Sanchez, San Francisco, CA (US); Theobolt N. Leung, San Francisco, CA (US); Holger Struppek, San Francisco, CA (US); Scott Howard, San Francisco, CA (US); John Minichiello, Normal, IL (US); Vinay Kumar, Fremont, CA (US)

(73) Assignee: BlueOwl, LLC, San Francisco, CA (US)

( * ) Notice: Subject to any disclaimer, the term of this patent is extended or adjusted under 35 U.S.C. 154(b) by 0 days.

(21) Appl. No.: 16/540,952

(22) Filed: Aug. 14, 2019

(65) Prior Publication Data
US 2022/0335382 A1 Oct. 20, 2022

Related U.S. Application Data

(60) Provisional application No. 62/822,236, filed on Mar. 22, 2019.

(51) Int. Cl.
*G06Q 10/10* (2023.01)
*G06Q 40/08* (2012.01)
*G06N 20/00* (2019.01)

(52) U.S. Cl.
CPC ............ *G06Q 10/10* (2013.01); *G06N 20/00* (2019.01); *G06Q 40/08* (2013.01)

(58) Field of Classification Search
CPC ...... G06Q 10/10; G06Q 40/08; G06K 9/6215; G06K 9/6284; G06N 20/00

(Continued)

(56) References Cited

U.S. PATENT DOCUMENTS 7,813,944 B1 * 10/2010 Luk .................. G06Q 10/10
705/4
8,117,049 B2 2/2012 Berkobin et al.
(Continued)

FOREIGN PATENT DOCUMENTS

CN 103810637 A 5/2014
WO 2017/176304 10/2017

OTHER PUBLICATIONS fidelity.com, "Mobile Check Deposit", Deposit checks on the go. Just snap a photo of a check with your iPhone®, iPad®, or Android™ device to make deposits directly into the Fidelity account of your choice, Copyright 1998-2019 FMR LLC, pp. 1-2. Retrieved from the Internet on: Aug. 15, 2019: https://www.fidelity.com/mobile/mobile-check-deposit.

(Continued)

*Primary Examiner* — Lindsay M Maguire
(74) *Attorney, Agent, or Firm* — Faegre Drinker Biddle & Reath LLP

(57) ABSTRACT

Systems and methods for analyzing documentation for assessing potential fraudulent user submissions are provided. According to certain aspects, a server computer may receive an initial set of documentation descriptive of damage to a property asset, and may analyze the initial set of documentation to determine whether additional documentation is needed. The server computer may initiate a communication channel with a user device via which the additional documentation may be submitted, and the server computer may similarly analyze the additional documentation to determine a likelihood of fraud. The server computer may process the user submission accordingly.

14 Claims, 7 Drawing Sheets

(58) Field of Classification Search
USPC .......................................................... 705/4
See application file for complete search history.

(56) References Cited

U.S. PATENT DOCUMENTS

| | | | |
|---|---|---|---|
| 9,047,778 | B1 | 6/2015 | Cazanas et al. |
| 9,151,692 | B2 | 10/2015 | Breed |
| 9,275,417 | B2 | 3/2016 | Binion et al. |
| 9,299,108 | B2 | 3/2016 | Diana et al. |
| 9,311,676 | B2 | 4/2016 | Helitzer et al. |
| 9,679,487 | B1 | 6/2017 | Hayward |
| 9,712,549 | B2 | 7/2017 | Almurayh |
| 9,870,448 | B1 | 1/2018 | Myers et al. |
| 9,904,928 | B1 | 2/2018 | Leise |
| 9,984,419 | B1 | 5/2018 | Manzella et al. |
| 9,984,420 | B1 | 5/2018 | Manzella et al. |
| 10,026,130 | B1 | 7/2018 | Konrardy et al. |
| 10,032,225 | B1 | 7/2018 | Fox et al. |
| 10,055,794 | B1 | 8/2018 | Konrardy et al. |
| 10,086,782 | B1 | 10/2018 | Konrardy et al. |
| 10,089,693 | B1 | 10/2018 | Konrardy et al. |
| 10,102,590 | B1 | 10/2018 | Farnsworth et al. |
| 10,106,083 | B1 | 10/2018 | Fields et al. |
| 10,134,278 | B1 | 11/2018 | Konrardy et al. |
| 10,156,848 | B1 | 12/2018 | Konrardy et al. |
| 10,157,423 | B1 | 12/2018 | Fields et al. |
| 10,163,327 | B1 | 12/2018 | Potter et al. |
| 10,163,350 | B1 | 12/2018 | Fields et al. |
| 10,166,994 | B1 | 1/2019 | Fields et al. |
| 10,168,703 | B1 | 1/2019 | Konrardy et al. |
| 10,181,161 | B1 | 1/2019 | Konrardy et al. |
| 10,185,997 | B1 | 1/2019 | Konrardy et al. |
| 10,185,998 | B1 | 1/2019 | Konrardy et al. |
| 10,185,999 | B1 | 1/2019 | Konrardy et al. |
| 10,269,074 | B1 | 4/2019 | Patel et al. |
| 10,354,333 | B1 | 7/2019 | Hayward |
| 10,410,289 | B1 | 9/2019 | Tofte et al. |
| 10,534,968 | B1 | 1/2020 | Clauss et al. |
| 10,832,327 | B1 | 11/2020 | Potter et al. |
| 11,216,888 | B2 | 1/2022 | Perl et al. |
| 11,417,208 | B1 | 8/2022 | Leung et al. |
| 2003/0200123 | A1 | 10/2003 | Burge et al. |
| 2004/0243423 | A1 | 12/2004 | Rix et al. |
| 2008/0243558 | A1 | 10/2008 | Gupte |
| 2010/0088123 | A1 | 4/2010 | McCall et al. |
| 2010/0145734 | A1 | 6/2010 | Becerra et al. |
| 2012/0076437 | A1 | 3/2012 | King |
| 2014/0081675 | A1 | 3/2014 | Ives et al. |
| 2015/0039397 | A1 | 2/2015 | Fuchs |
| 2015/0179062 | A1 | 6/2015 | Ralston et al. |
| 2015/0204684 | A1 | 7/2015 | Rostamian et al. |
| 2015/0363886 | A1 | 12/2015 | Fernandes et al. |
| 2016/0001544 | A1 | 1/2016 | Gydesen |
| 2017/0075740 | A1 | 3/2017 | Breaux et al. |
| 2017/0089710 | A1 | 3/2017 | Slusar |
| 2017/0109827 | A1 | 4/2017 | Huang et al. |
| 2017/0192428 | A1 | 7/2017 | Vogt et al. |
| 2017/0200367 | A1 | 7/2017 | Mielenz |
| 2017/0212511 | A1 | 7/2017 | Paiva et al. |
| 2017/0270615 | A1 | 9/2017 | Fernandes et al. |
| 2017/0270617 | A1 | 9/2017 | Fernandes et al. |
| 2017/0293894 | A1 | 10/2017 | Taliwal et al. |
| 2018/0070290 | A1 | 3/2018 | Breaux et al. |
| 2018/0070291 | A1 | 3/2018 | Breaux et al. |
| 2018/0182039 | A1* | 6/2018 | Wang ................... G06K 9/6268 |
| 2018/0194343 | A1 | 7/2018 | Lorenz |
| 2018/0307250 | A1 | 10/2018 | Harvey |
| 2019/0102840 | A1 | 4/2019 | Perl et al. |
| 2021/0042844 | A1 | 2/2021 | Potter et al. |
| 2021/0078629 | A1 | 3/2021 | Boss et al. |

OTHER PUBLICATIONS leadtools.com, "Credit Card Recognition SDK Technology", Copyright 2019 LEAD Technologies, Inc, pp. 1-2. Retrieved from the Internet on Aug. 15, 2019: https://www.leadtools.com/sdk/forms/credit-card.

Ruchi Verma and Sathyan Ramakrishna Mani, "Using Analytics for Insurance Fraud Detection", Digital Transformation, pp. 1-10.

truepic.com, "Photo and Video Verification You Can Trust", 2019 World Economic Forum Tech Pioneer, pp. 1-4. Retrieved from the Internet on Aug. 15, 2019: https://truepic.com/.

<https://gilsmethod.com/how-to-create-albums-and-upload-pictures-to-facebook-on-your-iphone>. GilsMethod, Oct. 15, 2019.

<https://grytics.com/blog/create-album-facebook-groups/>. Grytics. Oct. 15, 2019.

<https://www.dummies.com/social-media/facebook/how-to-edit-a-facebook-album/>. Dummies. Oct. 15, 2019.

<https://www.socmedsean.com/updated-facebook-tip-organizing-moving-and-editing-your-photos-and-albums/. SocMedSean. Oct. 15, 2019.

<https://www.thesocialmediahat.com/blog/how-to-update-your-new-mobile-facebook-profile/>. The Social Media Hat, Oct. 15, 2019.

Aleksandrowicz, P., Verification of motor vehicle post accident insurance claims. University of Science and Technology, Institute of Automation and Transport, Machine Maintenance Department, vol. 15, No. 1, 2020, pp. 25-38.

Li et al., An Anti-Fraud System for Car Insurance Claim Based on Visual Evidence, Retrieved from https://arxiv.org/pdf/1804.11207, Apr. 2018, 6 pages.

Jiangqin Peng, Nanjie Liu, Haitao Zhao and Minglu Yu, "Usage-based insurance system based on carrier-cloud-client," 2015 10th International Conference on Communications and Networking in China (ChinaCom), 2015, pp. 579-584, (Usage) (Year: 2015).

* cited by examiner

SYSTEMS AND METHODS FOR OBTAINING INCIDENT INFORMATION TO REDUCE FRAUD

CROSS-REFERENCE TO RELATED APPLICATIONS

This application claims the benefit of U.S. Provisional Application No. 62/822,236, filed Mar. 22, 2019 and titled "SYSTEMS AND METHODS FOR MINIMIZING AUTO CLAIMS FRAUD USING IMAGE DATA VALIDATION TECHNIQUES," which is incorporated by reference herein in its entirety.

FIELD

The present disclosure is directed to various information analysis techniques to detect fraud. More particularly, the present disclose is directed to platforms and techniques for analyzing information included in a user submission to determine whether additional information is needed and facilitating the collection of the additional information.

BACKGROUND

Electronic devices are increasingly being used to automate and facilitate certain processes that conventionally require manual facilitation. In particular, various forms of technologies associated with the submission of documentation are increasingly being used across various applications. For example, insurance claim filings may be supplemented with digital images depicting damage to insured properties, where the images may be captured using or accessed from a variety of applications or sources.

However, these technologies introduce the potential for the submission of inaccurate documentation or, in some cases, fraudulent activity. For example, the damage to insurance assets that is depicted in digital images may not have actually resulted from a loss event identified in a claim filing. Additionally, the digital images may be altered to depict a greater degree of damage than what is actually present. This may increase costs for the involved companies or entities, which may ultimately be borne by consumers.

Accordingly, there is an opportunity for platforms and techniques that incorporate technologies for reducing the potential for fraud associated with the submission of documentation.

SUMMARY

In an embodiment, a computer-implemented method of analyzing device-submitted documentation is provided. The method may include: receiving, from a user device, an initial set of documentation associated with a claim filing related to a property; analyzing, by a computer processor, the initial set of documentation to determine that additional documentation is needed; initiating, by the computer processor, a communication channel with the user device; transmitting, to the user device via the communication channel at a first time, information descriptive of additional documentation that is needed; receiving, from the user device via the communication channel, a subsequent set of documentation responsive to the information, the subsequent set of documentation having associated a second time; and analyzing, by the computer processor, the subsequent set of documentation to determine, based at least in part on a difference between the first time and the second time, a likelihood of fraud in association with the claim filing.

In another embodiment, a system for analyzing device-submitted documentation is provided. The system may include a transceiver configured to communicate with a user device via a network connection; a memory storing a set of instructions; and a processor interfaced with the transceiver and the memory. The processor may be configured to execute the set of instructions to cause the processor to: receive, from the user device via the transceiver, an initial set of documentation associated with a claim filing related to a property, analyze the initial set of documentation to determine that additional documentation is needed, initiate, via the transceiver, a communication channel with the user device, transmit, to the user device via the communication channel at a first time, information descriptive of additional documentation that is needed, receive, from the user device via the communication channel, a subsequent set of documentation responsive to the information, the subsequent set of documentation having associated a second time, and analyze the subsequent set of documentation to determine, based at least in part on a difference between the first time and the second time, a likelihood of fraud in association with the claim filing.

DETAILED DESCRIPTION

The present embodiments may relate to, inter alia, platforms and technologies for more accurately assessing fraud in association with documentation submission. According to certain aspects, systems and methods may enable submission of documentation from an electronic device, where the documentation may be related to damage to a property asset. The systems and methods may analyze the documentation to determine whether additional documentation is necessary and, if so, may initiate a communication channel with the electronic device.

The electronic device may enable a user to capture and compile additional documentation, and may submit the additional documentation via the communication channel, where submission of the additional documentation may have an associated temporal aspect or requirement. The systems and methods may determine whether the submission of the additional documentation complies with the temporal aspect and may also determine, based on all or part of the submitted documentation, whether any claims included in the documentation is potentially fraudulent. Based on the determinations, the systems and methods may process or deny the submission accordingly.

The systems and methods therefore offer numerous benefits. In particular, the systems and methods support a communication channel that enables users to effectively, efficiently, and securely submit documentation associated with a submission such as a claim filing. Additionally, the systems and methods more accurately detect instances of fraudulent submissions, which reduces costs for entities offering policies or otherwise processing the submissions, where these cost savings may ultimately be passed down to consumers. It should be appreciated that additional benefits are envisioned.

Figure 1:
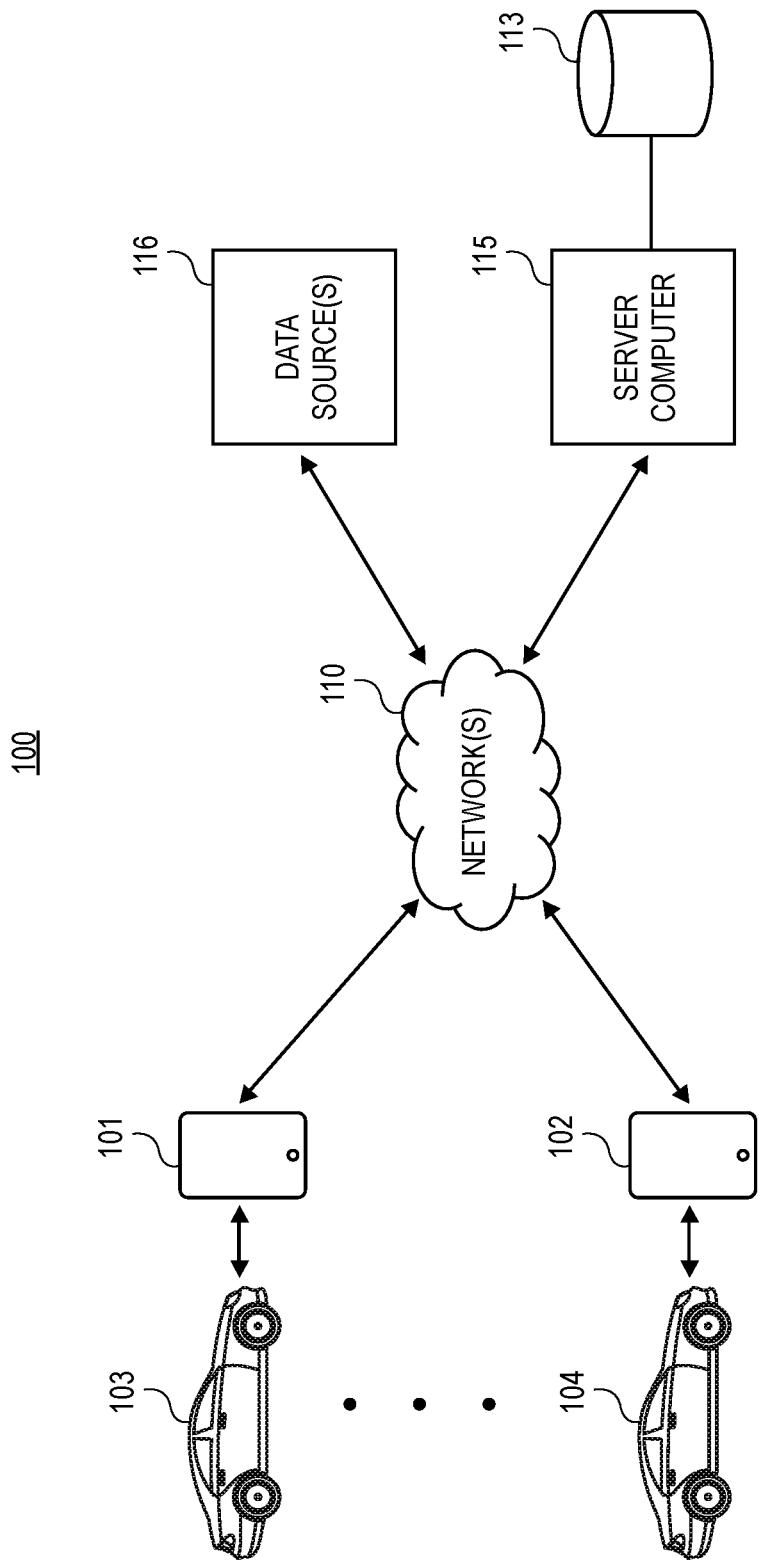
FIG. 1 depicts an overview of components and entities associated with the systems and methods, in accordance with some embodiments.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of electronic devices 101, 102. Each of the electronic devices 101, 102 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Generally, each of the electronic devices 101, 102 may be operated by an individual or person (generally, a user) having an association with a property, for example a vehicle, home, or other type of physical property capable of being owned or used. For example, a user may be a policyholder of an insurance policy for a vehicle. FIG. 1 depicts a set of vehicles 103, 104 respectively associated with the set of electronic devices 101, 102. Although FIG. 1 depicts two (2) electronic devices 101, 102 and two (2) vehicles 103, 104, it should be appreciated that fewer or more electronic devices and vehicles are envisioned. Additionally, although FIG. 1 depicts the vehicles 103, 104, it should be appreciated that the systems and methods may apply to additional or alternative properties (e.g., homes, boats, personal property, etc.).

In operation, the user may operate one of the devices 101, 102 to input data or information associated with a property in the event that the property is damaged (i.e., the occurrence of a "loss event"). In particular, the user may input (e.g., via a keyboard or dictation) a description of the damage to the property. Additionally, the user may use the corresponding device 101, 102 to capture (or access) digital images and/or videos of the property. Generally, the term "media" or "set of media" may be used throughout to describe visual content (e.g., digital images or digital videos) depicting a property. A given set of media may include a set of digital images and/or videos depicting various views and perspectives of a given property, where the given property may have damage to certain portions or areas to varying degrees.

The electronic devices 101, 102 may communicate with a server computer 115 via one or more networks 110. The server computer 115 may be associated with an entity such as a company, business, corporation, or the like, which manages policies, accounts, or the like for properties associated with users. For example, the server computer 115 may be associated with an insurance company that offers home and/or vehicle insurance policies held by users of the electronic devices 101, 102. The electronic devices 101, 102 may transmit or communicate, via the network(s) 110, the set of media and any another captured or inputted information or data to the server computer 115.

In embodiments, the network(s) 110 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). Further, in embodiments, the network(s) 110 may be any telecommunications network that may support a telephone call between the electronic devices 101, 102 and the server computer 115.

The system 100 may further include a set of external data sources 116 that may communicate with the server computer 115 and the electronic devices 101, 102 via the network(s) 110. According to embodiments, the set of external data sources 116 may provide information related to properties such as vehicles, data that may be used to train machine learning models, data used by the server computer 115 to support dedicated communication applications, and/or other data. Additionally or alternatively, the set of external data sources 116 may be associated with service providers (e.g., vehicle mechanics) or other entities.

The server computer 115 may be configured to interface with or support a memory or storage 113 capable of storing various data, such as in one or more databases or other forms of storage. According to embodiments, the storage 113 may store data or information associated with any machine learning models that are generated by the server computer 115, any sets of media received from the electronic devices 101, 102, and/or any other pertinent data.

According to embodiments, the server computer 115 may employ various machine learning techniques, calculations, algorithms, and the like to generate and maintain a machine learning model associated with media depicting properties that may be damaged. The server computer 115 may initially train the machine learning model using a set of training data (or in some cases, may not initially train the machine learning model). Generally, the set of training data may include a set of images and/or video depicting damage to various properties (e.g., vehicles), where the set of training data may include a set of labels input by a set of users who review the set of images and/or video. The storage 113 may store the trained machine learning model.

In operation, the server computer 115 may analyze the set of media received from one or more of the electronic devices 101, 102 using the machine learning model. In analyzing the set of media, the server computer 115 may generate an output that indicates or is descriptive of any property damage depicted in the set of media, as well as a confidence level. The server computer 115 may compare the confidence level to a set threshold level, and may determine whether additional documentation is needed and, if so, what additional documentation is needed.

If additional documentation is needed, the server computer 115 may open a communication channel with the appropriate device 101, 102, and the appropriate device 101, 102 may compile and transmit the additional documentation to the server computer 115 using the communication channel. The server computer 115 may analyze the additional documentation, for example using the machine learning model, to determine whether the claim filing is potentially fraudulent, and the server computer 115 may determine how to process the submission accordingly. These functionalities are further described with respect to FIG. 2.

Although depicted as a single server computer 115 in FIG. 1, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102 interface with the server computer 115, the electronic devices 101, 102 may actually interface with one or more of a number of distributed computers, servers, machines, or the like, to facilitate the described functionalities. Additionally, although one (1) server computer 115 is depicted in FIG. 1, it should be appreciated that greater or fewer amounts are envisioned.

Figure 2:
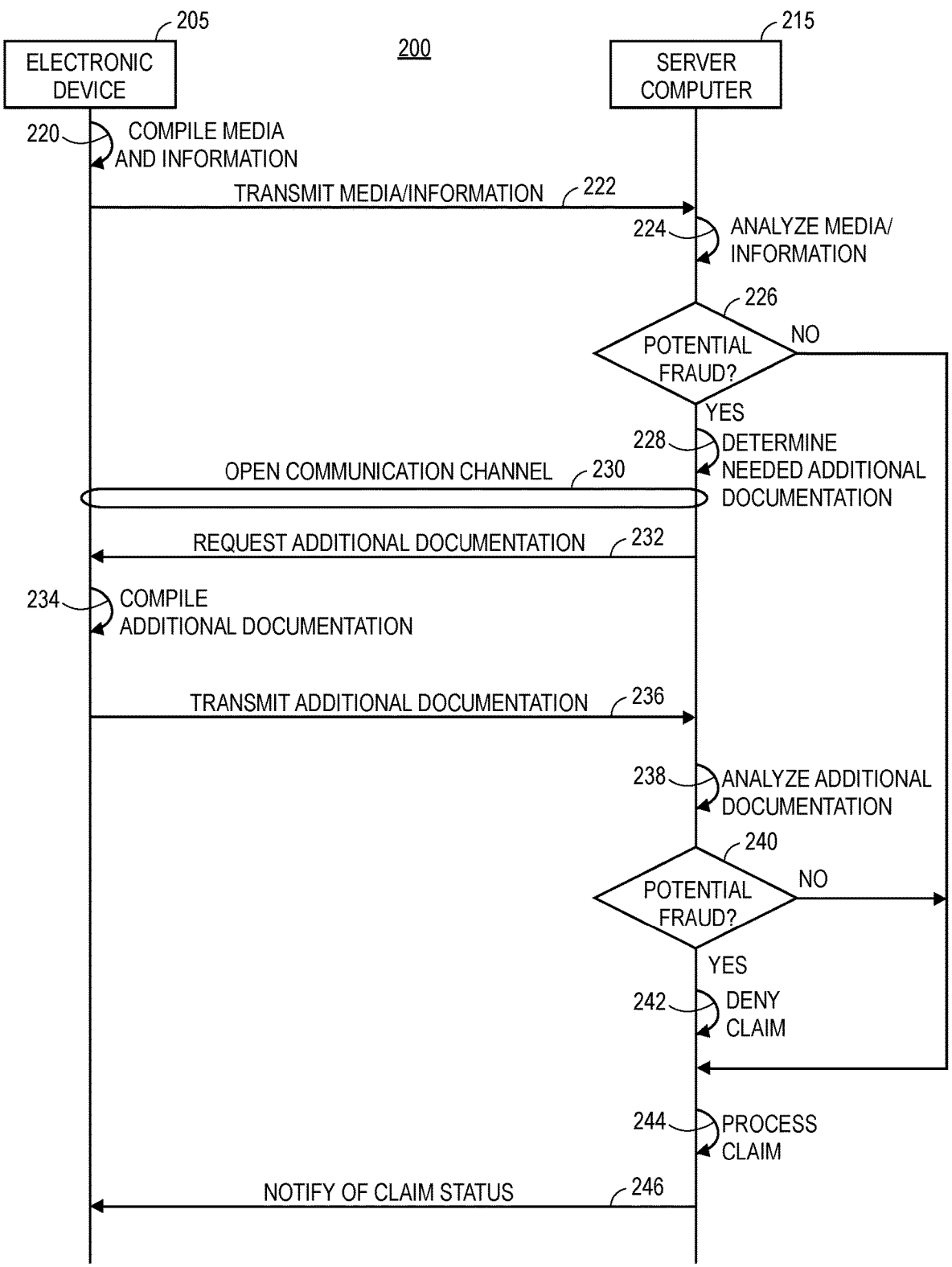
FIG. 2 depicts a signal diagram of certain components and functionalities associated therewith, in accordance with some embodiments.

FIG. 2 depicts a signal diagram 200 including various functionalities of the systems and methods. The signal diagram 200 includes an electronic device 205 (such as one of the user devices 101, 102, 103 as discussed with respect to FIG. 1A), and a server computer 215 (such as the server computer 115 as discussed with respect to FIG. 1A). The electronic device 205 may execute a dedicated application that is offered and/or managed by an entity associated with the server computer 215. A user of the electronic device 205 may have an account with the application, where the account may also be offered and/or managed by the entity.

According to embodiments, the server computer 215 may store a machine learning model that the server computer 215 may use to analyze data (e.g., a set of images). The machine learning model may be supervised or unsupervised, and may be trained using a set of training data. It should be appreciated that the server computer 215 may conduct the machine learning model analysis using various techniques, calculations, algorithms, or the like.

The signal diagram 200 may start when the electronic device 205 compiles (220) media and information. According to embodiments, the electronic device 205 may compile the media and information in response to a loss, theft, or damage (i.e., a "loss event") of an insured asset (e.g., a vehicle or other type of property). The media may be a set of digital images and/or digital videos that the electronic device may capture (e.g., via a camera application or an image capture feature integrated into the dedicated application), store, or otherwise access. The information may be textual content that the electronic device may receive via a user interface. In particular, the user may input a description of the loss event and any damage to the property, or may make selections descriptive of the damage via a set of interface screens that the electronic device may present. The information may also identify the user and/or the property (e.g., a make, model, and year of the vehicle, an odometer reading of the vehicle, etc.). As an example, the media may be five (5) images of a damaged SUV, with appended text describing damage to the driver's side doors of the SUV.

The electronic device 205 may transmit (222) the media and information to the server computer 215. In an embodiment, the electronic device 205 may transmit the media and information using the dedicated application, or via another communication channel (e.g., SMS), and the electronic device 205 may transmit the media and information at a first time. The server computer 215 may analyze (224) the media and information transmitted from the electronic device 205. In particular, the server computer 215 may use the stored machine learning model to analyze the set of media. In analyzing the media and information, the server computer 215 may generate an output that estimates a type and amount of damage indicated in the media and information, a confidence level for the estimated type and amount of damage, and an indication of a level of completeness of the media and information. For example, the server computer 215 may output that the transmitted media depicts damage to the rear driver's side door, having an estimated repair cost of $1,500, and with a confidence level of 60%. It should be appreciated that the server computer 215 may determine the confidence level using a variety of techniques or calculations, which may be based on a quality level and/or completeness of the data received from the user device 205.

The server computer 215 may determine (226) whether additional documentation and/or information is needed, where the determination may be based at least in part on the analysis of (224), and in particular on the level of the completeness of the media and information and/or the confidence level. According to embodiments, there may be a completeness threshold level and/or a confidence threshold level associated with the output from the machine learning model, where each of the completeness threshold level and the confidence threshold level may be a default value or specified by an administrator associated with the server computer 215. Additionally, there may be multiple threshold levels that may be based on such factors as make, model, and year of a vehicle, amount of miles on the odometer, the estimated amount of damage, and/or other factors. For example, the completeness threshold level may be 80% and the confidence threshold level may be 60% for a vehicle that is over ten (10) years old and having an estimated damage amount of $2,000 and under; and another completeness threshold level may be 90% and another confidence threshold level may be 85% for a vehicle that is less than two (2) years old and having an estimated damage amount of $10,000 and over. The server computer 215 may store the threshold levels as well as a set of rules for applying the threshold levels. A positive determination in (226) may be based on one or both of the determined levels at least meeting their respective threshold levels.

If the server computer 215 determines that additional documentation is not needed ("NO"), processing may proceed to (244). If the server computer 215 determines that additional documentation is needed ("YES"), the server computer 215 may determine (228) the additional documentation that is needed. Generally, the additional documentation that is needed may be documentation that is deficient from the media and information transmitted in (222). Additionally or alternatively, the server computer 215 may determine the additional documentation based on a discrepancy between damage identified from the set of media and damage described in the information; and/or damage to a particular portion(s) of the property, where the particular portion(s) is not depicted in the media. For example, if the information describes extensive damage to a hood of a vehicle but the damage analysis is (224) outputs minimal damage to the hood, the needed additional documentation may be additional images of the hood. For further example, if the information describes damage to the trunk of a vehicle but the set of media does not include any images of the trunk, the needed additional documentation may be one or more images of the trunk.

After determining the needed additional documentation, the server 215 may open or initiate (230) a communication channel with the electronic device 205 via a network connection (e.g., via the network(s) 110 as discussed with respect to FIG. 1). In embodiments, the communication channel may be facilitated by the dedicated application executing on the electronic device 205, which may be in contrast to a communication channel via a third-party service (e.g., SMS) or application (e.g., a messaging application). In this regard, the dedicated application may direct or otherwise facilitate the compilation, capturing, and transmitting of the additional documentation.

The server computer 215 may request (232) the additional documentation, such as via the communication channel opened on (230). In requesting the additional documentation, the server computer 215 may generate a set of instructions descriptive of the how to obtain or compile the additional documentation. It should be appreciated that the set of instructions may be a series of steps that the user of the electronic device 205 may follow in capturing or compiling the additional documentation. For example, if the additional documentation needed is two images of a front driver's side door of a vehicle, the set of instructions may detail which two views of the front driver's side door is needed.

The electronic device 205 may compile (234) the additional documentation. In particular, the electronic device 205 may use the dedicated application to present the set of instructions and guide the user in collecting or capturing the additional documentation. In embodiments, the dedicated application may support an image capturing feature, such as if a particular set of images is needed. If textual or descriptive information is needed, the dedicated application may enable the user to input the needed information via a user interface. For example, the set of instructions may direct the user to describe damage that is depicted in the media that was originally transmitted in (222).

In embodiments, there may be a temporal aspect or requirement associated with capturing or compiling the additional information. In a scenario, where the electronic device 205 transmits the media and information in (222) at a first time (or otherwise the server computer 215 analyzes the media and information at the first time), the server computer 215 may require and communicate that the additional documentation be 1) captured and/or transmitted after the first time, and/or 2) captured and/or transmitted within a certain time after the first time or after the additional documentation is requested. For example, the set of instructions may indicate that the additional documentation needs to be submitted within five (5) minutes from when the additional documentation is requested.

After the electronic device 205 captures and compiles the additional documentation, the electronic device 205 may transmit (236) the additional documentation to the server computer 215 via the communication channel. The server computer 215 may analyze (238) the additional documentation, where the server computer 215 may analyze the additional documentation in a similar manner as the analysis of (224). Additionally, the server computer 215 may determine whether the submission of the additional documentation is complaint with any temporal requirements, and may determine whether the additional documentation actually fulfills or matches the additional documentation that was determined as needed in (228). In a particular embodiment, the server computer 215 may examine any metadata associated with the additional documentation to determine whether the additional documentation was previously captured or compiled.

Moreover, the server computer 215 may output an estimated amount of damage and a confidence level associated with the analysis of (238), and may compare these outputs to the outputs from (224). In comparing the outputs, the server computer 215 may determine (240) whether there is potential fraud in association with the claim filing. It should be appreciated that the server computer 215 may determine potential fraud in a variety of ways.

In one embodiment, the server computer 215 may determine that the claim filing is potentially fraudulent if the additional documentation submission does not comply with any temporal requirements. For example, if the additional documentation was needed within five (5) minutes and the additional documentation was submitted six (6) minutes after the request, then the additional documentation is not compliant with this temporal requirement. Additionally or alternatively, the server computer 215 may determine that the claim filing is potentially fraudulent if the amount of damage estimated in (238) differs from the amount of damage estimated in (224) by a threshold percentage or amount. Additionally or alternatively, the server computer 215 may determine that the claim filing is potentially fraudulent if the confidence level determined in (238) does not at least meet a confidence level threshold. It should be appreciated that the server computer 215 may determine whether the claim filing is potentially fraudulent using other metrics, determinations, or the like.

If the server computer 215 determines that the claim filing is potentially fraudulent ("YES"), the server computer 215 may deny (242) the claim. If the server computer 215 determines that the claim filing is not potentially fraudulent ("NO"), the server computer 215 may process (244) the claim. In either case, the server computer 215 may notify (246) the electronic device (e.g., via the communication channel or other communication) of the status of the claim filing.

FIGS. 3A-3D, 4A, and 4B depict example interfaces associated with the systems and methods. In embodiments, the interfaces may be displayed by an electronic device, such as one of the electronic devices 101, 102 as discussed with respect to FIG. 1. Further, a user of the electronic device may have an association with a property (e.g., a policyholder) and/or who submits documentation associated with the property. The interfaces may be accessed and reviewed by a user, where the user may make selections, capture images, or facilitate other functionalities. Further, the interfaces may be included as a part of a dedicated application that may execute on the electronic device.

Figure 3B:
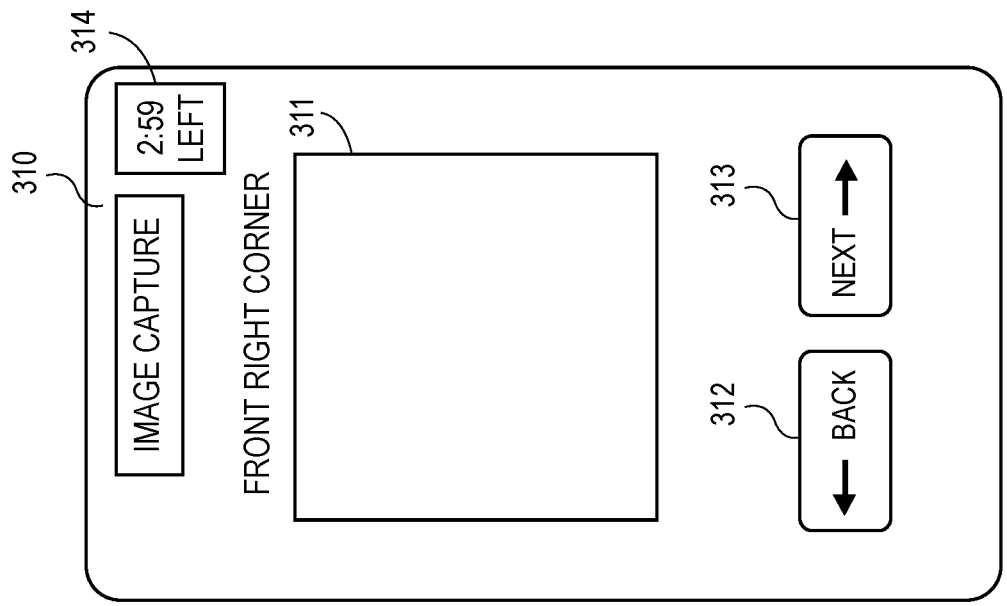
FIGS. 3A-3D, 4A, and 4B depict example interfaces associated with the submission and assessment of additional documentation, in accordance with some embodiments.
Figure 3A:
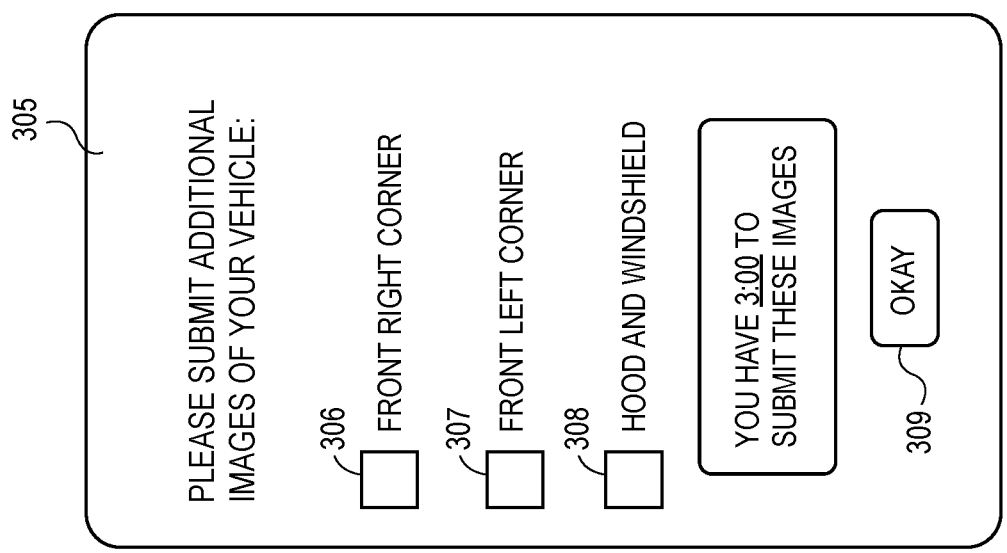

FIGS. 3A-3D depict example interfaces associated with the compilation of additional documentation need in association with a submission. FIG. 3A depicts an interface 305 that instructions the user to submit three (3) additional images of the user's vehicle: a front right corner (306), a front left corner (307), and the hood and windshield (308). The interface 305 further indicates that the user has 3:00 to submit these images. Additionally, the interface 305 includes an okay selection 309 that, upon selection by the user, causes the dedicated application to start the 3:00 clock and enable for the capture of the requested images.

FIG. 3B depicts an interface 310 associated with the capture of the front right corner of the vehicle. In particular, the interface 310 includes a live view 311 that guides the user in capturing an image of the front right corner. Additionally, the interface 310 includes a back selection 312 that, when selected, causes the dedicated application to return to the previous interface (in this case, the interface 305 of FIG. 3A). Further, the interface 310 includes a time remaining indication 314 that identifies an amount of remaining time (in this case, 2:59). Moreover, the interface 310 includes a next selection 313 that, when selected, causes the dedicated application to capture an image of the front right corner of the vehicle and proceed to the next interface (in this case, an interface 315 of FIG. 3C).

Figure 3D:
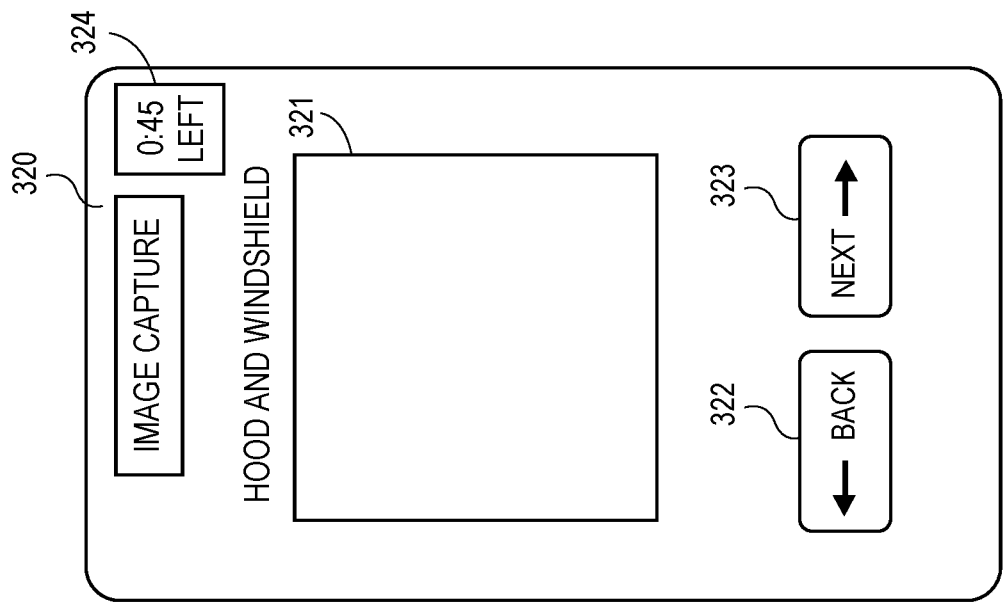
Figure 3C:
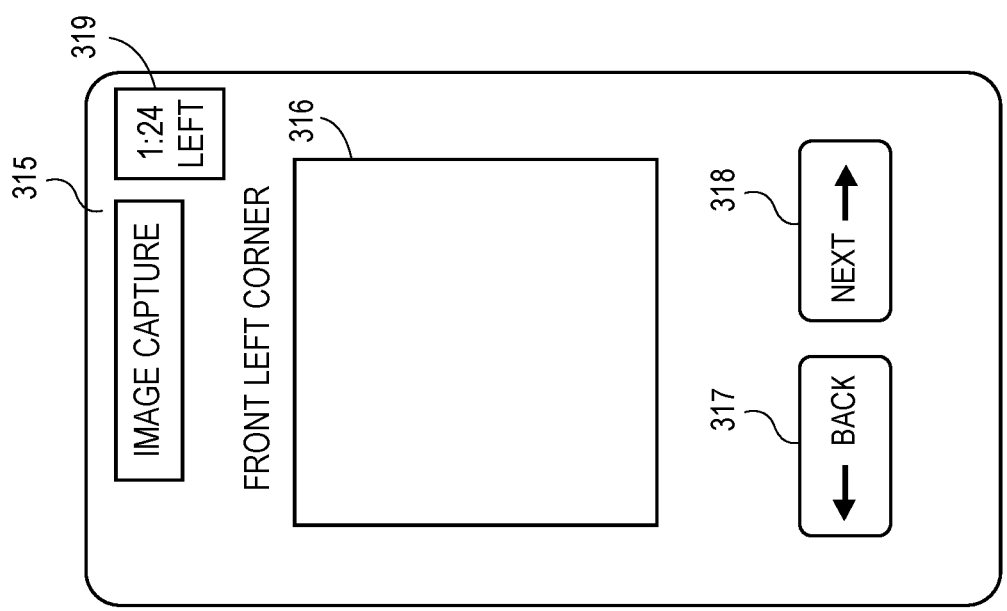

FIG. 3C depicts an interface 315 associated with the capture of the front left corner of the vehicle. In particular, the interface 315 includes a live view 316 that guides the user in capturing an image of the front left corner. Additionally, the interface 315 includes a back selection 317 that, when selected, causes the dedicated application to return to the previous interface (in this case, the interface 310 of FIG.

3B). Further, the interface 315 includes a time remaining indication 319 that identifies an amount of remaining time (in this case, 1:24). Moreover, the interface 315 includes a next selection 318 that, when selected, causes the dedicated application to capture an image of the front left corner of the vehicle and proceed to the next interface (in this case, an interface 320 of FIG. 3D).

FIG. 3D depicts an interface 320 associated with the capture of the hood and windshield of the vehicle. In particular, the interface 320 includes a live view 321 that guides the user in capturing an image of the hood and windshield. Additionally, the interface 320 includes a back selection 322 that, when selected, causes the dedicated application to return to the previous interface (in this case, the interface 315 of FIG. 3C). Further, the interface 320 includes a time remaining indication 324 that identifies an amount of remaining time (in this case, 0:45). Moreover, the interface 320 includes a submit selection 323 that, when selected, causes the dedicated application to capture an image of the hood and windshield of the vehicle and submit the captured images for further processing.

Figure 4B:
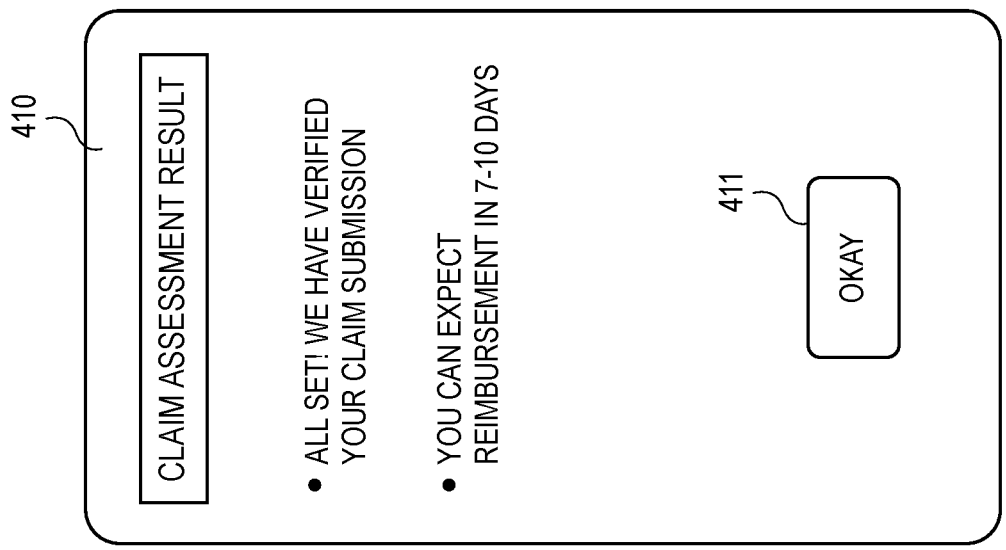
Figure 4A:
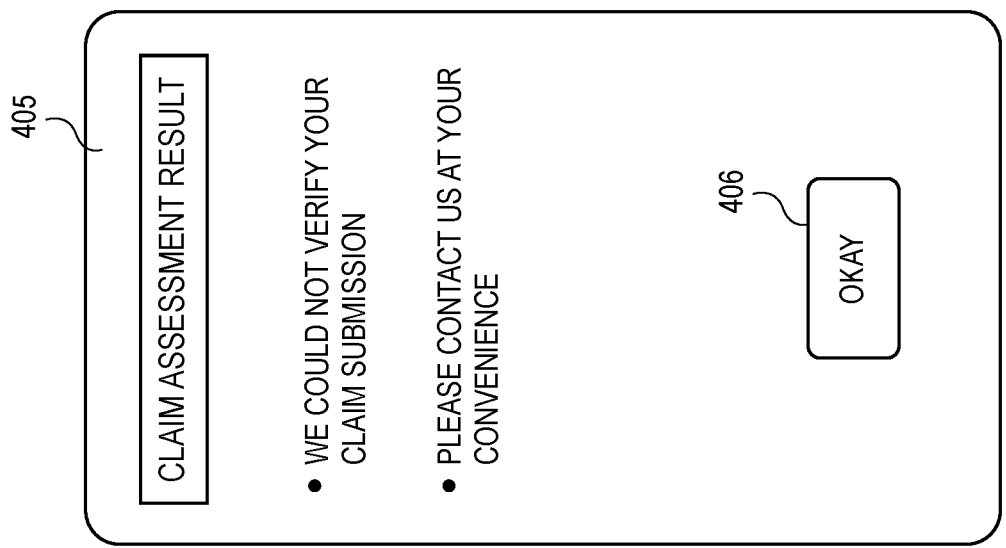

FIG. 4A depicts an interface 405 that describes a result of an assessment of additional documentation submitted by an electronic device. In particular, the assessment of the additional documentation was not able to verify or validate the information included in the submission. The interface 405 includes text that describes this assessment accordingly, and includes an okay selection 406 that, when selected, causes the electronic device to dismiss the interface 405 and proceed to additional functionality.

FIG. 4A depicts an interface 405 that describes a result of an assessment of additional documentation submitted by an electronic device. In particular, the assessment of the additional documentation was not able to verify or validate the information included in the submission. The interface 405 includes text that describes this assessment accordingly, and includes an okay selection 406 that, when selected, causes the electronic device to dismiss the interface 405 and proceed to additional functionality.

FIG. 4B depicts an interface 410 that describes a result of an additional assessment of additional documentation submitted by an electronic device. In particular, the assessment of the additional documentation was able to verify or validate the information included in the submission. The interface 410 includes text that describes this assessment accordingly, and includes an okay selection 411 that, when selected, causes the electronic device to dismiss the interface 410 and proceed to additional functionality.

Figure 5:
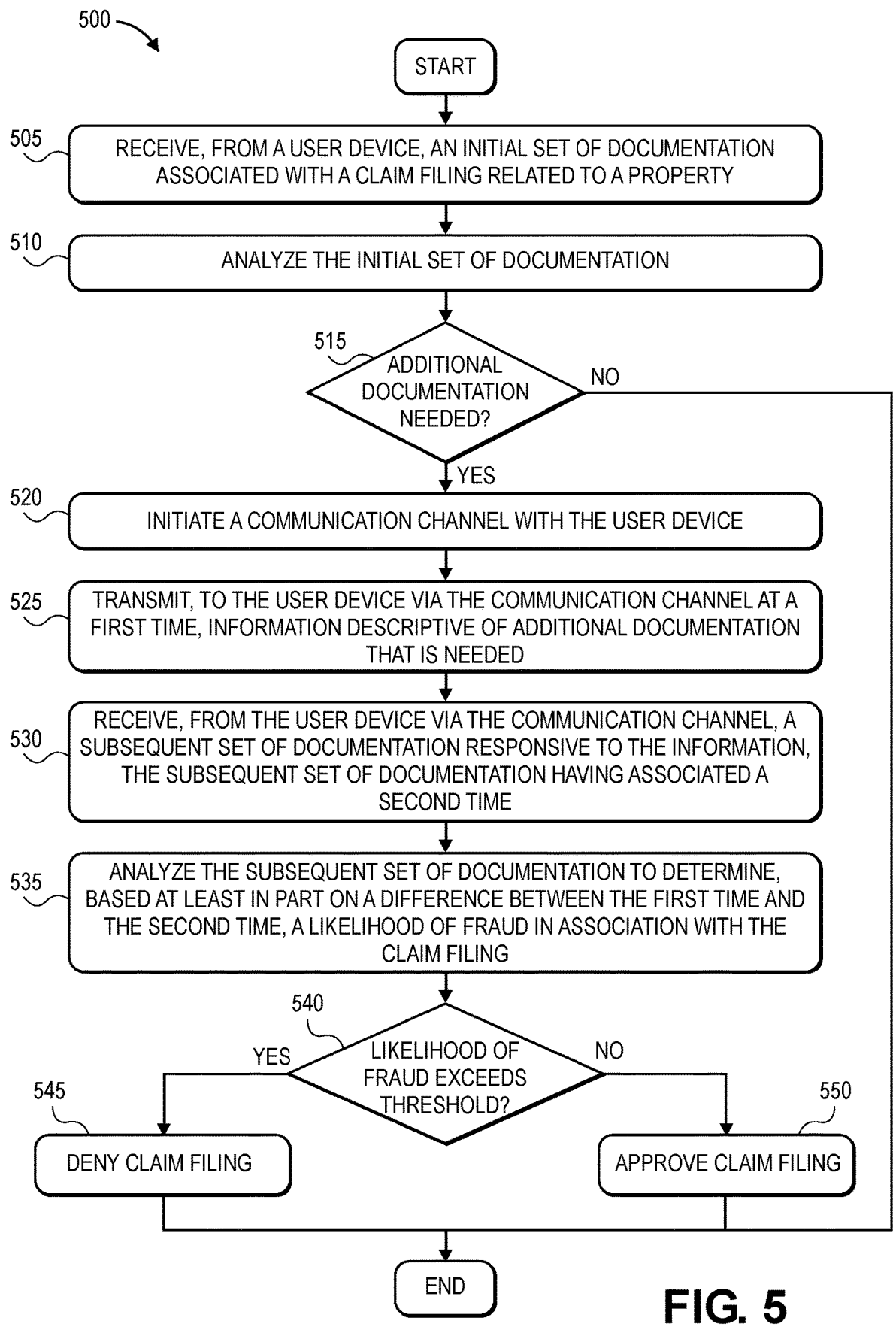
FIG. 5 is an example flowchart associated with analyzing device-submitted documentation, in accordance with some embodiments.

FIG. 5 depicts is a block diagram of an example method 500 for analyzing device-submitted documentation. The method 500 may be facilitated by an electronic device (such as the server computer 215 as discussed with respect to FIG. 2) that may be in communication with additional devices and/or data sources.

The method 500 may begin when the electronic device receives (block 505), from a user device, an initial set of documentation associated with a claim filing related to a property. In embodiments, the initial set of documentation may include a set of image data depicting the property and information describing damage to the property.

The electronic device may analyze (block 510) the initial set of documentation. In particular, the electronic device may analyze, using a machine learning model, the set of image data to determine a depicted amount of damage to the property, and compare the depicted amount of damage to the property to the information describing damage to the property. Alternatively or additionally, the electronic device may analyze the initial set of documentation to calculate an initial likelihood of fraud.

The electronic device may determine (block 515) whether additional documentation is needed. In particular, the electronic device determine whether the initial likelihood of fraud at least exceeds a threshold level, which may be indicative that additional documentation is needed. If the electronic device determines that additional documentation is not needed ("NO"), processing may end or proceed to other functionality (e.g., processing the claim filing using the initial set of documentation).

If the electronic device determines that additional documentation is needed ("YES"), the electronic device may initiate (block 520) a communication channel with the user device. In embodiments, the electronic device may initiate the communication channel via an application executed by the user device.

The electronic device may transmit (block 525), to the user device via the communication channel at a first time, information descriptive of additional documentation that is needed. In embodiments, the electronic device may determine the additional documentation that is needed, for example based on the analysis of the initial set of documentation. Additionally or alternatively, the electronic device may transmit a set of instructions for capturing a set of digital images depicting the property via an image capture function of the application executed by the user device. The set of instructions may indicate a time limit for capturing the set of digital images, wherein the application enables a user of the user device to capture, via the image capture function, the set of digital images within the time limit.

The electronic device may receive (block 530), from the user device via the communication channel, a subsequent set of documentation responsive to the information, where the subsequent set of documentation has associated a second time. In embodiments, the electronic device may receive, from the user device via the communication channel at the second time, the subsequent set of documentation responsive to the information. Alternatively, the electronic device may determine, from metadata associated with the subsequent set of documentation, the second time corresponding to when the subsequent set of documentation was captured. For example, even though the electronic device may receive the subsequent set of documentation at some time (t), the metadata may indicate that the subsequent set of documentation was actually created at a much earlier time (e.g., a month before receipt).

The electronic device may analyze (block 535) the subsequent set of documentation to determine, based at least in part on a difference between the first time and the second time, a likelihood of fraud in association with the claim filing. Additionally, the electronic device may determine (block 540) whether the likelihood of fraud exceeds a threshold.

If the likelihood of fraud exceeds the threshold ("YES"), the electronic device may deny (block 545) the claim filing. If the likelihood of fraud does not exceed the threshold ("NO"), the electronic device may approve (block 550) the claim filing.

Figure 6:
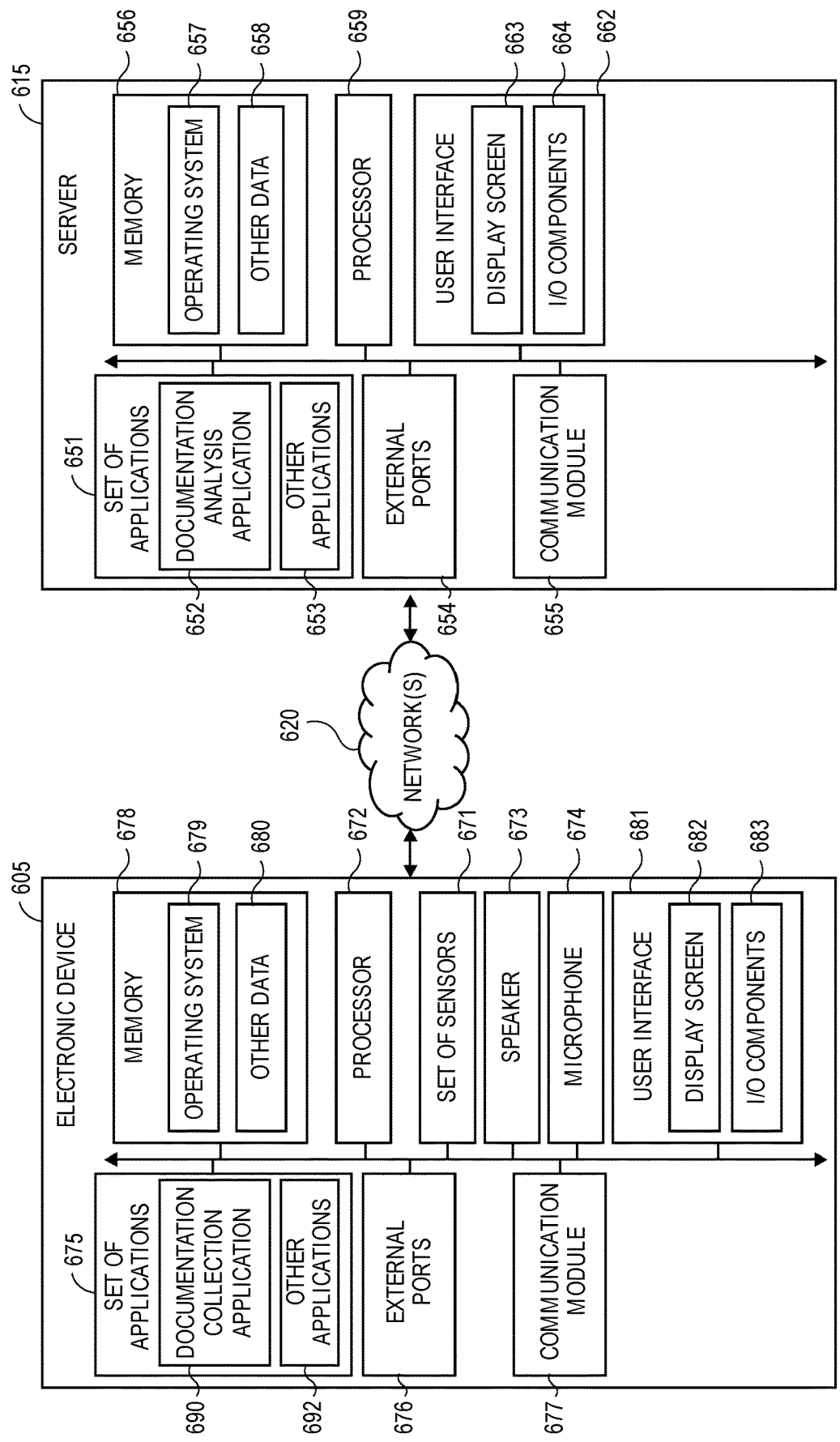
FIG. 6 a hardware diagram depicting an example server and an example electronic device.

FIG. 6 illustrates a hardware diagram of an example electronic device 605 (such as one of the electronic devices 101, 102 as discussed with respect to FIG. 1) and an example server 615 (such as the server computer 115 as discussed with respect to FIG. 1), in which the functionalities as discussed herein may be implemented.

The electronic device 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a documentation collection application 690 configured to facilitate collection and compilation of documentation, as discussed herein. It should be appreciated that one or more other applications 692 are envisioned.

The processor 672 may interface with the memory 678 to execute the operating system 679 and the set of applications 675. According to some embodiments, the memory 678 may also include other data 680 including data associated with collected documentation and/or other data. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 610. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may communicate with the server 615 via the network(s) 610.

The electronic device 605 may include a set of sensors 671 such as, for example, a location module (e.g., a GPS chip), an image sensor, an accelerometer, a clock, a gyroscope, a compass, a yaw rate sensor, a tilt sensor, telematics sensors, and/or other sensors. The electronic device 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review a set of instructions associated with the capture of documentation (e.g., images and inputted information). Additionally, the electronic device 605 may include a speaker 673 configured to output audio data and a microphone 674 configured to detect audio.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the server 615 via the network(s) 610. The server 615 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a documentation analysis application 652 configured to analyze submitted documentation, as discussed herein. It should be appreciated that one or more other applications 653 are envisioned.

The processor 659 may interface with the memory 656 to execute the operating system 657 and the set of applications 651. According to some embodiments, the memory 656 may also include other data 658, such as data associated with a data model, data received from the electronic device 605, and/or other data. The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The documentation analysis application 652 may operate using a machine learning model included as part of the other data 658 stored in the memory 656. The documentation analysis application 652 may employ machine learning techniques such as, for example, a regression analysis (e.g., a logistic regression, linear regression, or polynomial regression), k-nearest neighbors, decision trees, random forests, boosting, neural networks, support vector machines, deep learning, reinforcement learning, latent semantic analysis, Bayesian networks, or the like. Generally, the server 615 may support various supervised and/or unsupervised machine learning techniques. In an embodiment, the documentation analysis application 652 (or another application) may initially train a machine learning model with training data, and store the resulting machine learning model in the memory 656. In another embodiment, the documentation analysis application 652 (or another application) may generate and update the machine learning model, and the corresponding machine learning data, based on any documentation received from the electronic device 605.

The server 615 may further include a communication module 655 configured to communicate data via the one or more networks 610. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654. For example, the communication module 655 may receive, from the electronic device 605, a set of documentation compiled using the documentation collection application 690.

The server 615 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the server 615 via the user interface 662 to review information, make selections, and/or perform other functions.

In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of analyzing device-submitted documentation, the method comprising:
   receiving, by one or more processors, an initial set of documentation associated with a claim filing related to a damaged property, the initial set of documentation including one or more initial images depicting the damaged property and textual information describing the damaged property;
   analyzing, by the one or more processors using a machine learning model, the one or more initial images and determining a depicted amount of damage to the damaged property based upon the analysis;
   comparing, by the one or more processors using the machine learning model, the depicted amount of damage to the damaged property to the textual information describing the damaged property and calculating an initial likelihood of fraud based upon the comparison;
   determining, by the one or more processors using the machine learning model, that additional documentation is needed when the initial likelihood of fraud exceeds an initial threshold level;
   in response to determining that the additional documentation is needed, automatically opening, by the one or more processors, a communication channel with a user device;
   transmitting in response to the opening of the communication channel, by the one or more processors to the user device via the communication channel at a first time, a set of instructions for capturing an additional set of one or more images further depicting the damaged property via an image sensor of the user device, the set of instructions identifying one or more locations on the damaged property and a capture time limit;
   causing a capture time remaining indicator based upon the first time and the capture time limit to be displayed on the user device;
   receiving, by the one or more processors from the user device via the communication channel at a second time, the additional set of one or more images captured according to the set of instructions and an image capture time indicating when the additional set of one or more images was captured;
   analyzing, by the one or more processors using the machine learning model, the additional set of one or more images and image capture time, and calculating a likelihood of fraud in association with the claim filing based upon the analysis, wherein the analysis includes determining whether the one or more images of the additional set correspond to the one or more locations on the damaged property identified by the instructions, and whether the image capture time is within the capture time limit following the first time;
   determining, by the one or more processors using the machine learning model, whether the likelihood of fraud in association with the claim filing exceeds a threshold level;
   in response to determining that the likelihood of fraud in association with the claim filing exceeds the threshold level, notifying, by the one or more processors to the user device, that the claim filing is denied; and
   in response to determining that the likelihood of fraud in association with the claim filing does not exceed the threshold level, notifying, by the one or more processors to the user device, that the claim filing is approved.

2. The computer-implemented method of claim 1, further comprising:
   outputting, by the one or more processors using the machine learning model, an indication of completeness of the initial set of documentation and
   determining, by the one or more processors using the machine learning model, a confidence level based at least in part upon the indication of completeness.

3. The computer-implemented method of claim 1, further comprising:
   using, by the one or more processors, a set of training data to train the machine learning model using a set of training data.

4. The computer-implemented method of claim 1, wherein the image sensor is configured to capture the additional set of one or more images in accordance with the set of instructions.

5. The computer-implemented method of claim 1, further comprising:
   analyzing, by the one or more processors using the machine learning model, metadata associated with the additional set of one or more images to generate a metadata analysis result; and
   determining, by the one or more processors using the machine learning model, the likelihood of fraud based at least in part on the metadata analysis result.

6. A system for analyzing device-submitted documentation, the system comprising:
   a memory storing a set of instructions including a machine learning model; and
   a processor coupled to the memory, and configured to:
      receive an initial set of documentation associated with a claim filing related to a damaged property, the initial set of documentation including one or more initial images depicting the damaged property and textual information describing the damaged property;

analyze, using the machine learning model, the one or more initial images and determining a depicted amount of damage to the damaged property based upon the analysis;

compare, using the machine learning model, the depicted amount of damage to the damaged property to the textual information describing the damaged property and calculating an initial likelihood of fraud based upon the comparison;

determine, using the machine learning model, that additional documentation is needed when the initial likelihood of fraud exceeds an initial threshold level;

in response to determining that the additional documentation is needed, automatically opening a communication channel with a user device;

transmit, in response to the opening of the communication channel, to the user device via the communication channel at a first time, a set of instructions for capturing an additional set of one or more images further depicting the damaged property via an image sensor of the user device, the set of instructions identifying one or more locations on the damaged property and a capture time limit;

causing a capture time remaining indicator based upon the first time and the capture time limit to be displayed on the user device;

receive, from the user device via the communication channel at a second time, the additional set of one or more images captured according to the set of instructions and an image capture time indicating when the additional set of one or more images was captured;

analyze, using the machine learning model, the additional set of one or more images and image capture time, and calculate a likelihood of fraud in association with the claim filing based upon the analysis, wherein the analysis includes determining whether the one or more images of the additional set correspond to the one or more locations on the damaged property identified by the instructions, and whether the image capture time is within the capture time limit following the first time;

determine, using the machine learning model, whether the likelihood of fraud in association with the claim filing exceeds a threshold level;

in response to determining that the likelihood of fraud in association with the claim filing exceeds the threshold level, notifying the user device that the claim filing is denied; and in response to determining that the likelihood of fraud in association with the claim filing does not exceed the threshold level, notifying the user device that the claim filing is approved.

7. The system of claim 6, wherein the processor is further configured to:

output, using the machine learning model, an indication of completeness of the initial set of image data documentation; and determine, using the machine learning model, a confidence level based at least in part upon the indication of completeness.

8. The system of claim 6, wherein the processor is further configured to:

using a set of training data to train the machine learning model using a set of training data.

9. The system of claim 6 wherein the image capture sensor is configured to capture the additional set of one or more images in accordance with the set of instructions.

10. The system of claim 6, wherein the processor is further configured to:

analyze, using the machine learning model, metadata associated with the additional set of one or more images to generate a metadata analysis result; and determine, using the machine learning model, the likelihood of fraud based at least in part on the metadata analysis result.

11. A computer-implemented method of analyzing device-submitted documentation, the method comprising:

receiving, by one or more processors, an initial set of documentation associated with a claim filing related to a damaged property, the initial set of documentation including one or more initial images depicting the damaged property and textual information describing the damaged property;

analyzing, by the one or more processors using a machine learning model, the initial set of documentation and calculating an initial likelihood of fraud based upon the analysis;

determining, by the one or more processors using the machine learning model, that additional documentation is needed when the initial likelihood of fraud exceeds an initial threshold level;

in response to determining that the additional documentation is needed, automatically opening, by the one or more processors, a communication channel with a user device;

generating and transmitting in response to the opening of the communication channel, by the one or more processors to the user device via the communication channel at a first time, a set of instructions for capturing an additional set of one or more images further depicting the damaged property via an image sensor of the user device, the set of instructions identifying one or more locations on the damaged property and a capture time limit;

causing a capture time remaining indicator based upon the first time and the capture time limit to be displayed on the user device;

receiving, by the one or more processors from the user device via the communication channel at a second time, the additional set of one or more images captured according to the set of instructions and an image capture time indicating when the additional set of one or more images was captured;

analyzing, by the one or more processors using the machine learning model, the additional set of one or more images and image capture time, and calculating a likelihood of fraud in association with the claim filing based upon the analysis, wherein the analysis includes determining whether the one or more images of the additional set correspond to the one or more locations on the damaged property identified by the instructions and whether the image capture time is within the capture time limit following the first time;

determining, by the one or more processors using the machine learning model, whether the likelihood of fraud in association with the claim filing exceeds a threshold level;

in response to determining that the likelihood of fraud in association with the claim filing exceeds the threshold level, notifying, by the one or more processors to the user device, that the claim filing is denied; and in response to determining that the likelihood of fraud in association with the claim filing does not exceed the threshold level, notifying, by the one or more processors to the user device, that the claim filing is approved.

12. The computer-implemented method of claim 11, further comprising:

outputting, by the one or more processors using the machine learning model, an indication of completeness of the initial set of documentation; and determining, by the one or more processors using the machine learning model, a confidence level based at least in part upon the indication of completeness.

13. The computer-implemented method of claim 11, wherein the image sensor is configured to capture the additional set of image data in accordance with the set of instructions.

14. The computer-implemented method of claim 11, further comprising:

analyzing, by the one or more processors using the machine learning model, metadata associated with the additional set of image data to generate a metadata analysis result; and determining, by the one or more processors using the machine learning model, the likelihood of fraud based at least in part on the metadata analysis result.

* * * * *